United States Patent Office 3,449,306
Patented June 10, 1969

3,449,306
MODIFIED BLOCK COPOLYMERS AND PRODUCTION THEREOF
Robert P. Zelinski, Bartlesville, Okla., assignor to Phillips Petroleum Company, a corporation of Delaware
No Drawing. Filed Apr. 23, 1964, Ser. No. 362,174
Int. Cl. C08d *3/02, 1/20*
U.S. Cl. 260—83.7                                3 Claims

ABSTRACT OF THE DISCLOSURE

Block copolymers of conjugated alkadienes and vinyl aromatic hydrocarbons are made with an organolithium initiator by initially copolymerizing a mixture of the monomers and thereafter copolymerizing the vinyl aromatic hydrocarbon with a minor proportion of the conjugated alkadiene.

---

This invention relates to new block copolymers. In one aspect, it relates to the production of a modified block copolymer.

It is known in the prior art to produce copolymers of conjugated diolefins and vinyl aromatic compounds by the use of an organolithium catalyst. Thus a mixture comprising a major proportion of 1,3-butadiene and a minor proportion of styrene can be subjected to polymerization conditions in the presence of an organolithium catalyst such as an alkyl lithium. Under these conditions, the butadiene reacts much more rapidly than the styrene so that when the butadiene has become substantially completely reacted, unreacted styrene is still present and continues to polymerize. While the molecular structure of the resulting copolymer is not completely understood, it is believed that the resulting copolymer molecule is made up of two types of segments or blocks one of which is a main skeletal chain of butadiene units with styrene units attached in a random manner and another segment is substantially completely composed of styrene units, thus:

-Bd-Bd-Bd-Bd-Bd-St-Bd-Bd-Bd-Bd-St-Bd-Bd-Bd-Bd-St-St-St-

Bd representing butadiene units and St representing styrene units. This type of polymer is readily characterizable by its behavior in oxidative degradation analysis.

It has now been found that the so-called block copolymers hereinbefore described can be advantageously modified by a reaction technique hereinafter more fully described. While the present invention is not limited by any theory of molecular structure, it appears that the copolymers of this invention may have a molecular structure composed of two different blocks or segments, the first of which has a chain of butadiene units with lesser numbers of interspersed styrene units and the other block or segment of which is a preponderantly polystyrene chain with a few interspersed butadiene units, thus:

-Bd-Bd-Bd-St-Bd-Bd-Bd-St-Bd-
          Bd-Bd-St-St-St-Bd-St-St-St-Bd-

Those skilled in the art will readily realize that the foregoing formulae are merely illustrative and greatly oversimplified; the actual total number of monomer units and the actual number of monomer units in a given segment are much greater than shown in these formulae.

An object of this invention is to produce a novel copolymer. Another object is to provide a reaction technique by which so-called block copolymers can be modified. Other objects and advantages will become apparent to those skilled in the art upon consideration of this disclosure.

According to this invention, a mixture of a conjugated alkadiene and a vinyl aromatic hydrocarbon is subjected to copolymerization conditions in the presence of an organolithium catalyst and, after the initially charged alkadiene has substantially completely reacted and the reaction of the remaining vinyl aromatic is in process, a minor proportion of conjugated alkadiene is supplied to the reaction zone.

The products according to this invention are rubbery copolymers of a conjugated alkadiene and a vinyl aromatic hydrocarbon, hereinafter more particularly defined. The preferred comonomers are 1,3-butadiene and styrene. Many of the butadiene-styrene copolymers according to this invention contain from 2 to 45 weight percent of the bound styrene as polystyrene, as determined by oxidative degradation, also more completely described subsequently herein. Frequently, the polystyrene content is in the range 5 to 15 percent of the bound styrene.

In one embodiment, the invention comprises copolymerizing a major proportion of a conjugated alkadiene and a minor proportion of vinyl aromatic hydrocarbon in a first reaction zone or a first reaction period and subjecting to copolymerization conditions in a second reaction zone or period a major proportion of a vinyl aromatic hydrocarbon and a minor proportion of a conjugated alkadiene, an organolithium catalyst being present in both zones or periods. It is usually unnecessary to add catalyst in the second zone or period, since some unconsumed original organolithium may remain and, in any event, lithium chemically combined in the polymer promotes continued polymerization.

The conjugated alkadienes which can be used in accordance with this invention are generally those having from 4 to 8 carbon atoms per molecule and are most frequently chosen from the group 1,3-butadiene, 2-methyl-1,3-butadiene (isoprene) and 1,3-pentadiene (piperylene) because these are the most readily available hydrocarbons of this class.

The vinyl aromatic hydrocarbons used according to this invention are generally vinyl-substituted benzenes and naphthalenes wherein the hydrocarbon substituents attached to the aromatic ring contain a total of not more than 12 carbon atoms. Examples are styrene, 3-methylstyrene, 1-vinylnaphthalene, 2-vinylnaphthalene and alkyl, cycloalkyl, aryl, alkaryl and aralkyl derivatives of these compounds.

The organolithium compounds utilized according to this invention as initiators or catalysts for the copolymerization can be represented by the formula $$RLi_x$$

wherein R is selected from the group consisting of aliphatic, cycloaliphatic and aromatic hydrocarbon radicals containing from 1 to 20 carbon atoms and $x$ is an integer in the range of 1 to 4. These materials are well known in the polymerization art. Specific compounds of this class utilizable as catalysts or initiators according to this invention include the following:

methyllithium,
isopropyllithium,
n-butyllithium,
sec-butyllithium, tert-butyllithium,
n-amyllithium,
tert-octyllithium,
n-decyllithium,
phenyllithium,
2-naphthyllithium,
4-butylphenyllithium,
p-tolyllithium,
4-phenylbutyllithium,
cyclohexyllithium,
4-butylcyclohexyllithium,
4-cyclohexylbutyllithium,
1,4-dilithiobutane,
1,10-dilithiodecane,
1,20-dilithioeicosane,
1,4-dilithiocyclohexane,
1,4-dilithio-2-butene,
1,8-dilithio-3-decene,
1,4-dilithiobenzene,
1,2-dilithio-1,2-diphenylethane,
1,2-dilithio-1,8-diphenyloctane,
1,3,5-dilithiopentane,
1,5,15-trilithioeicosane,
1,2,5-trilithiocyclohexane,
1,3,5,8-tetralithiodecane,
1,5,10,20-tetralithioeicosane,
1,2,4,6-tetralithiocyclohexane,
4,4'-dilithiobiphenyl, and reaction products of lithium with condensed ring aromatic compounds such as naphthalene, anthracene, and phenanthrene and alkyl derivatives thereof in which the total number of carbon atoms in the alkyl group or groups is preferably in the range of 1 to 6. The catalyst concentration in the reaction mixture can vary within broad limits, but is usually within the range 0.05 to 5 weight percent, based on total monomers.

The copolymerization according to this invention is usually conducted at a temperature in the range $-20$ to $+150°$ C. ($-4$ to $302°$ F.) and most frequently within the range 25 to 125° C. (77 to 257° F.). The pressure can vary within a wide range and need be only sufficient to maintain a liquid phase in the reaction zone.

It is frequently advantageous and convenient to supply to the reaction zone an inert diluent, preferably a hydrocarbon which is liquid and inert under the reaction conditions. Suitable diluents are paraffinic, cycloparaffinic, and aromatic hydrocarbons such as isopentane, n-hexane, the isooctanes, cyclopentane, cyclohexane and the dimethylcyclohexanes, methylcyclohexane, benzene, toluene, and the xylenes.

In one embodiment of the invention, a mixture of the alkadiene and the vinyl aromatic hydrocarbon in a suitable liquid diluent are charged together with the organolithium catalyst to a reaction zone in which both a liquid and a vapor phase are maintained. The amount of vinyl aromatic hydrocarbon in the initial mixture is generally within the range 15 to 60 weight percent of total monomers. However, proportions outside this range can be used. At the time polymerization is initiated, or after reaction has begun, a small amount of conjugated diene is supplied into the vapor space in the reaction zone. Generally the addition of this small amount of alkadiene is complete when the conversion in the polymerization zone has reached 90 percent. While the amount of conjugated diene added in this manner can vary within a wide range, it is generally within the range 2 to 7 weight percent of the original conjugated diene charged to the liquid phase.

In the embodiment just described, it appears that the alkadiene in the liquid phase reacts very rapidly so that it is substantially consumed before all of the vinyl aromatic has been consumed. The vinyl aromatic then continues to polymerize. It is thought that the alkadiene supplied to the vapor phase may diffuse into the liquid phase, necessarily at a rather low rate, and, once in the liquid phase, copolymerizes with the vinyl aromatic forming comonomer diene units attached to a main vinyl aromatic chain. The invention, however, is not limited to any theoretical explanation.

In another embodiment of this invention, the entire charge of alkadiene and vinyl aromatic is fed into the reactor in which is maintained a liquid and a vapor phase, and the continuous subsequent addition of conjugated diene to the vapor phase can be omitted, since in a partially filled reactor, a substantial part of the conjugated diene is initially in the vapour phase. In this embodiment, the polymerization temperature is preferably maintained at at least 65° C. (150° F.). Maintaining an elevated temperature of this order maintains a high polymerization rate so that the rate of consumption of alkadiene by polymerization in the liquid phase exceeds the rate of diffusion of alkadiene from the vapor phase into the liquid phase. While the realtive volumes of vapor and liquid phase in the reactor can vary widely, excellent results are obtained when volume of the vapor phase amounts to 30 to 70 volume percent of the entire reactor volume. Frequently the vapor space is within the range 40 to 60 percent of the reactor volume.

In accordance with another embodiment of this invention, the copolymerization can be conducted in a series of two or more reactors. In this embodiment, the first reactor is employed for the polymerization stage in which the initially charged alkadiene is substantially completely consumed. The effluent from this reaction zone can then be charged to a second reaction zone into which a minor amount of the alkadiene as compared with the untreated vinyl aromatic, is supplied, preferably to the vapor phase.

In still another embodiment of the invention, the copolymerization can be conducted in a long pipe or tubular reactor. In this embodiment, an initial reaction mixture comprising a major proportion of the alkadiene and a minor proportion of the vinyl aromatic is initially charged, and at a downstream point in the reactor at which the initially charged diene has been substantially completely consumed and unreacted vinyl aromatic is still present, a minor amount of conjugated alkadiene (based on the amount of unreacted vinyl aromatic still present) can be supplied at one or more points.

In the embodiments just mentioned, the point or time at which the initially charged alkadiene has become substantially completely consumed can readily be determined by sampling the reaction mixture, destroying the catalyst in the sample, and analyzing for unreacted monomers, all in accordance with analytical techniques well known to those skilled in this art.

EXAMPLE I

A run was conducted in accordance with this invention utilizing the following recipe:

| | |
|---|---|
| 1,3-butadiene, parts by weight | 75 |
| Styrene, parts by weight | 25 |
| Cyclohexane, parts by weight | 1000 |
| n-Butyllithium, mhm.[1] | 2.2 |

[1] Gram millimoles per 100 grams monomers.

Cyclohexane was charged to the reactor which was subsequently purged with nitrogen. The butadiene was then added and followed by the styrene. The reactor temperature was maintained at 212° F. and the butyllithium was then added to initiate polymerization. Two minutes after polymerization had begun, 4.1 parts by weight of butadiene per 100 parts monomer charged initially was metered into the vapor phase of the reactor over a four-minute period. The reaction was then shortstopped by the addition of a small volume of isopropyl alcohol containing, as an antioxidant, 2,2'-methylene-bis(4-methyl-6-tertiary butylphenol) in the amount of 1 part by weight per hundred parts by weight of polymer. The amount of this solution added was initially insufficient to coagulate the polymer. The polymer was subsequently coagulated by the addition of more isopropanol. The coagulated polymer was then separated by decantation of the liquid and was dried. The following results were obtained:

| | |
|---|---|
| Conversion, percent based on the original monomers plus subsequently metered butadiene | 95.2 |
| Refractive index | 1.5362 |
| Bound styrene, wt. percent, by refractive index | 24.4 |
| Polystyrene, wt. percent, by oxidative degradation | [1] 3.3 |
| Inherent viscosity | 0.98 |
| Gel, percent | 0 |
| Mooney viscosity, ML-4 at 212° F. | 36 |

[1] 13.5% of the bound styrene.

The relatively low polystyrene content of the polymer indicates that butadiene units have been incorporated or attached to the main styrene skeleton in the block of the polymer molecule that contains the predominant amount of styrene units.

EXAMPLE II

A series of runs was conducted in which the amount of liquid phase was varied in the reactor from substantially liquid full to approximately half full. In each run, 2.5 mhm. of n-butyllithium was employed as the catalyst. Otherwise the polymerization recipe was the same as in Example I. The cyclohexane was charged first to the reactor, which was then purged with nitrogen. The butadiene and the styrene were then introduced in that order. The temperature was brought to 212° F. and the butyllithium was then added. The polymerization was continued for 15 minutes. The following results were obtained:

| | 1 | 2 | 3 (control) |
|---|---|---|---|
| Charge level [1] | 0.5 | 0.75 | 1.0 |
| Conversion, percent | 97.1 | 98.6 | |
| Refractive Index | 1.5366 | 1.5372 | 1.5368 |
| Bound styrene, wt. percent, by refractive index | 25.0 | 25.8 | 25.2 |
| Polystyrene, wt. percent, by oxidative degradation | [2] 0.7 | [3] 11.6 | [4] 18.3 |
| Inherent viscosity | 0.95 | 0.84 | 1.07 |
| Gel, percent | 0 | 0 | 0 |
| ML-4 at 212° F | 33 | 29 | 77 |

[1] A charge level of 1.0 indicates reactor was substantially liquid full at the reaction temperature. Smaller charges indicate presence of vapor phase with equilibrium between monomers in vapor and liquid phases.
[2] 2.8% of the bound styrene.
[3] 44.9% of the bound styrene.
[4] 72.6% of the bound styrene.

The oxidative degradation results indicate that butadiene remained in the vapor space in Runs 1 and 2 after substantially complete consumption of the butadiene in the liquid phase and subsequently diffused and copolymerized into the styrene block of the polymer. Thus, as the relative volume of vapor space increased, the weight percent polystyrene determined by the oxidative degradation decreased.

EXAMPLE III

A further series of runs in accordance with this invention was conducted in accordance with the procedure of Run 1 of Example II, except that the catalyst concentration was varied. The products recovered from the series of runs were then all blended together. The runs are summarized in the following table:

vapor phase into the liquid phase while the polymerization of residual styrene was in progress.

The blend of polymers resulting from the foregoing six runs was compounded to form an electrical insulation stock recipe. The properties of the raw polymer were determined as were the properties of the vulcanized material. The following results were obtained:

Compounding, recipe, parts by weight

| | |
|---|---|
| Block copolymer | 100 |
| Zinc oxide | 10 |
| Stearic acid | 10 |
| Agerite Stalite [1] | 1.5 |
| Dixie clay [2] | 100 |
| Purecal M [3] | 50 |
| Cumar MH 2½ [4] | 15 |
| Sulfur | 2 |
| Altar [5] | 1.5 |
| Methyl Zimate [6] | 0.5 |

Raw polymer properties

| | |
|---|---|
| ML-4 at 212° F. | 36.3 |
| Compounded ML-4 at 212° F. | 31.4 |
| Scorch at 280° F. | 11.6 |
| Extrusion at 180° F.— | |
| In./min. | 84.0 |
| g./min. | 136.0 |
| Rating (Garvey die) | 12— |

Cured 30 minutes at 307° F.

| | |
|---|---|
| Compression set, percent | 52.7 |
| 200% modulus, p.s.i. | 630 |
| Tensile, p.s.i. | 1120 |
| Elongation, percent | 805 |
| Tear resistance, lbs./in. | 250 |
| Shore A hardness | 81.5 |
| Gehman freeze point, ° C. | —75 |

[1] Octylated diphenylamine.
[2] A hard-type, white-to-cream-colored kaolin (aluminum silicate); sp. gr. 2.60.
[3] Chemically precipitated calcium carbonate containing a minimum of 98.5% CaCO₃; particle size of 0.12–.32 micron.
[4] Polymers of indene, coumarene, and associated coal tar compounds; melting point 115–125° C.; ash (maximum) 0.5%; sp. gr. 15.5° C./15.5° C. 1.130.
[5] Benzothiazyl disulfide.
[6] Zinc dimethyldithiocarbamate.

The foregoing results show the utility of the copolymers in accordance with this invention as electrical insulation.

EXAMPLE IV

A modified butadiene-styrene block copolymer in accordance with this invention was compared with an unmodified block copolymer prepared under substantially the same conditions except that the reactor was liquid-full and no butadiene other than the present in the initial charge was added during reaction.

The following recipe was employed:

| | |
|---|---|
| 1,3-butadiene, parts by wt. | 75 |
| Styrene, parts by wt. | 25 |
| n-Hexane, parts by wt. | 800 |
| n-Butyllithium, parts by wt. | 0.062 |
| Initiation temperature, ° F. | 130 |
| Time, hours | 0.8 |
| Conversion, percent | 100 |

| | 1 | 2 | 3 | 4 | 5 | 6 |
|---|---|---|---|---|---|---|
| n-Butyllithium, mhm | 2.5 | 2.0 | 2.0 | 2.0 | 2.5 | 2.5 |
| Temperature, °F | 212 | 212 | 250 | 212 | 212 | 212 |
| Time, minutes | 15 | 15 | 10 | 15 | 15 | 15 |
| Conversion, percent | 95.3 | 94.6 | 93.8 | 100 | 96.4 | 97.1 |
| Refractive index | 1.5360 | 1.5361 | 1.5379 | 1.5358 | 1.5364 | 1.5366 |
| Bound styrene, wt. percent, by refractive index | 24.0 | 24.2 | 26.9 | 23.9 | 24.7 | 25.0 |
| Polystyrene, wt. percent | 0 | 0.8 | 1.2 | 1.3 | 1.4 | 0.7 |
| Polystyrene, percent of bound styrene | 0 | 3.3 | 4.5 | 5.4 | 5.7 | 2.8 |
| Inherent viscosity | 1.10 | 1.24 | | 1.00 | 0.87 | 0.95 |
| Gel, percent | 0 | 0 | | 0 | 0 | 0 |
| Mooney viscosity, ML-4 at 212° F | 44.0 | 70.5 | 56 | 26 | 25 | 33 |
| Grams polymer in blend | 38 | 29 | 42 | 40 | 39 | 34 |

The comparatively low polystyrene contents in the foregoing table indicate the diffusion of butadiene from the In preparing the modified copolymer in accordance with this invention, the n-hexane was charged to the reactor (previously flushed with nitrogen) first and heated to 130° F. Styrene, butadiene, and butyllithium were then added in that order. Polymerization was initiated at 130° F. and allowed to proceed adiabatically, the maximum temperature being about 200° F. During reaction, the volume of the liquid phase amounted to approximately 50 percent of the entire reactor space. The polymerization was shortstopped with 0.75 part by weight, per hundred parts by weight of rubber, of mixed fatty acids (average, approximately 18 carbon atoms per molecula). One part by weight, per hundred of copolymer, of 2,6-di-tert-butyl-4-methylphenol was added. Most of the solvent was removed by vaporization, and the polymer was kneaded to remove remaining traces of solvent and extruded at 250° F.

The two copolymers were evaluated in ASTM and electrical insulation recipes. The following data were obtained:

units in block polymers containing no ethylenic bonds remain unattacked. The small fragments (low molecular weight aldehydes) and the low molecular weight polystyrene fragments resulting from oxidative attack by the peroxide on the ethylenic double bonds of the copolymer block are soluble in ethanol, whereas the high molecular weight polystyrene resulting from the detachment of styrene homopolymer blocks by the oxidation is insoluble in ethanol. It is thus possible to effect a separation of the high molecular weight polystyrene which constitutes the homopolymer blocks detached from the block copolymer.

Approximately 0.5 gram of the copolymer is cut into small pieces, weighed to within 1 milligram, and charged to a 125-ml. flask. Forty to fifty grams of p-dichlorobenzene is then charged to the flask, and the flask is heated to 130° C. The flask is maintained at this temperature until the polymer present has dissolved. The

|  | ASTM | | Electrical Insulation | |
| --- | --- | --- | --- | --- |
|  | Modified block block copolymer | Unmodified block copolymer | Modified block copolymer | Unmodified block copolymer |
| Compounding recipes, parts by weight: | | | | |
| Polymer | 100 | 100 | 100 | 100 |
| High abrasion furnace black |  | 40 |  |  |
| Zinc oxide | 5 | 5 | 10 | 10 |
| Sulfur | 2 | 2 | 2 | 2 |
| Benzothiazyl disulfide | 2 | 2 | 1.5 | 1.5 |
| Stearic acid | 5 | 5 | 10 | 10 |
| Agerite stalite [1] |  |  | 1.5 | 1.5 |
| Dixie clay [1] |  |  | 100 | 100 |
| Purecal O [2] |  |  | 50 | 50 |
| Cumar MH 2½ [1] |  |  | 15 | 15 |
| Zinc dimethyldithiocarbamate |  |  | 0.5 | 0.5 |
| Physical properties: | | | | |
| Bound styrene, wt. percent [3] | 24.6 | 26.6 | 24.6 | 26.6 |
| Polystyrene, wt. percent [4] | 5.4 | 17.5 | 5.4 | 17.5 |
| Mooney viscosity: | | | | |
| Raw ML-4 at 212° F | 51 | 46 | 51 | 46 |
| Compound ML-4 at 212° F | 62.5 | 60 | 46.7 | 41.8 |
|  | Cured 25 min., 293° F. | | Cured 30 min., 307° F. | |
| Properties of vulcanizates: | | | | |
| 200% modulus, p.s.i. |  |  | 640 | 675 |
| 300% modulus, p.s.i. | 1,070 | 1,310 |  |  |
| Tensile, p.s.i. | 3,010 | 2,250 | 1,555 | 840 |
| Elongation, percent | 790 | 670 | 755 | 725 |
| Shore A hardness | 75 | 76.5 | 78.0 | 79.0 |

[1] As in Example III.
[2] Chemically precipitated $CaCO_3$; particle size 0.15–0.30 micron; sp. gr. 2.65.
[3] By refractive index.
[4] By oxidative degradation.

Lower polystyrene content and higher tensile strength in both types of recipe was exhibited by the modified block copolymer according to this invention, as shown by the foregoing data. The improvement shown is highly valuable since, in commerce, there are frequently minimum requirements of tensile strength for mechanical rubber goods to be used in certain applications such as gasget stock, hose, and belts for transmission of power in industrial machinery. These requirements are frequently exacting and difficult to meet with many synthetic materials. The higher tensile strength exhibited by polymers according to this invention, as hereinbefore shown, readily enables one to meet many of these industrial specifications.

Properties referred to in the foregoing examples were determined as follows:

Bound styrene is determined from a graph of refractive index plotted against styrene content for a number of butadiene-styrene copolymers of known styrene content. The same type of plot can readily be made by those skilled in the art when different dienes and/or vinyl aromatics are used as comonomers. This value represents the total chemically combined styrene units in the copolymer molecule, no matter how connected.

Polystyrene by oxidative degradation.—This oxidation method is based upon the principle that polymer molecules containing ethylenic bonds, when dissolved in p-dichlorobenzene and toluene, can be broken into fragments by reaction with tert-butyl hydroperoxide catalyzed with osmium tetroxide. Saturated polymer molecules or molecular fragments such as polystyrene or the polystyrene solution is then cooled to 80 to 90° C., and 8.4 ml. of a 71.3 percent by weight aqueous solution of tert-butyl hydroperoxide is added. One ml. of 0.003-molar solution of osmium tetroxide in toluene is then added to the flask contents, and the resulting solution is heated between 110 and 115° C. for ten minutes. The solution is then cooled to between 50 and 60° C., 20 ml. of toluene is added, and the solution is poured slowly into 250 ml. of ethanol containing a few drops of concentrated sulfuric acid. Polystyrene coagulates from solution, and this polymer is recovered, dride and weighed. The polystyrene content, in weight percent of the original copolymer, is calculated.

Inherent viscosity.—One-tenth gram of polymer is placed in a wire cage made from 80-mesh screen, and the cage is placed in 100 ml. of toluene contained in a wide-mouth, 4-ounce bottle. After standing at room temperature (approximately 77° F.) for 24 hours, the cage is removed, and the solution is filtered through a sulfur absorption tube of grade C porosity to remove any solid particles present. The resulting solution is run through a Medilia-type viscometer supported in a 77° F. bath. The viscometer is previously calibrated with toluene. The relative viscosity is the ratio of the viscosity of the polymer solution to that of toluene. The inherent viscosity is calculated by dividing the natural logarithm of the relative viscosity by the weight of the original sample.

Gel, weight percent.—Determination of gel is made along with the inherent viscosity determination. The wire cage is calibrated for toluene retention in order to correct the weight of swelled gel and to determine accurately the weight of dry gel. The empty cage is immersed in toluene and allowed to drain three minutes in a closed wide-mouth, 2-ounce bottle. A piece of folded quarter-inch hardware cloth in the bottom of the bottle supports the cage with minimum contact. The bottle containing the cage is weighed to the nearest 0.02 gram during a minimum 3-minute draining period after which the cage is withdrawn and the bottle again weighed to the nearest 0.02 gram. The difference in the two weighings is the weight of the cage plus the toluene retained by it, and by subtracting the weight of the empty cage from this value the weight of toluene retention is found, i.e., the cage calibration. In the gel determination, after the cage containing the polymer sample has stood for 24 hours in toluene, the cage is withdrawn from the toluene bottle with the aid of forceps and placed in the 2-ounce bottle. The same procedure is followed for determining the weight of swelled gel as is used for calibration of the cage. The weight of swelled gel is corrected by subtracting the cage calibration.

Mooney viscosity, ML-4 at 212° F.—ASTM Method D1646-61.

Extrusion at 180° F.—Garvey et al., Ind. Eng. Chem. 34, 1309 (1942).

Compression set, percent.—ASTM Method D-395-61.

Modulus (p.s.i.), tensile (p.s.i.), and elongation, percent.—ASTM Method D-412-61T.

Tear resistance, p.s.i.—ASTM Method D-624-54.

Shore A hardness. — ASTM Method D-676-59T (Shore Durometer, Type A).

Gehman freeze point.—ASTM Method D-1053-61, modified as follows: Gehman torsional apparatus used. Test specimens were 1.625 inches long, 0.125 inch wide and 0.077 inch thick. The angle of twist is measured at 5° C. intervals. Freeze point is determined by extrapolation to zero twist.

I claim:
1. In a process for copolymerizing a conjugated alkadiene having from 4 to 8 carbon atoms per molecule with a vinyl aromatic hydrocarbon selected from the group consisting of vinyl benzenes and vinyl naphthalenes wherein the total hydrocarbon substituent groups on the aromatic ring contain from 2 to 12 carbon atoms, the copolymerization being conducted in the presence of an organolithium initiator, the improvement which comprises forming within a polymerization zone a liquid phase reaction mass including a monomer mixture from 15 to 60 weight percent of which is said vinyl aromatic hydrocarbon and the remainder said conjugated alkadiene, said zone being of sufficient size to leave a portion of its volume as vapor space, maintaining conditions in said zone such that said conjugated alkadiene and said vinyl aromatic hydrocarbon copolymerize in said liquid phase, and adding to said vapor space an amount of conjugated alkadiene equal to about 2 to 7 weight percent of the original conjugated alkadiene in said liquid phase, said adding of additional conjugated diene being carried out during at least 90 percent of the conversion of monomer in said zone, said conjugated alkadiene in said vapor phase diffusing into said liquid phase as said conjugated alkadiene in said liquid phase is consumed.

2. The process of claim 1 wherein conjugated alkadiene is 1,3-butadiene and said vinyl aromatic hydrocarbon is styrene.

3. The process of claim 2 wherein said organolithium initiator is n-butyllithium.

References Cited
UNITED STATES PATENTS

| | | | |
|---|---|---|---|
| 2,886,616 | 5/1959 | Mertz et al. | 260—683.15 |
| 3,251,905 | 5/1966 | Zelinski | 260—880 |

OTHER REFERENCES

Korotor et al.: Poly. Sci. U.S.S.R. 2 (1961) (pp. 284–298), pp. 284, 287, 289, and 297 relied on.

Kuntz: J. Poly. Sci. 54 (1961) (pp. 569–586), pp. 569, 573 and 575–576 relied on.

GEORGE F. LESMES, *Primary Examiner.*

K. E. KUFFNER, *Assistant Examiner.*

U.S. Cl. X.R.

260—41.5, 829, 879, 880